March 28, 1939.   C. KAYSER   2,152,413
CORN RELOADER
Filed June 13, 1938   3 Sheets-Sheet 1
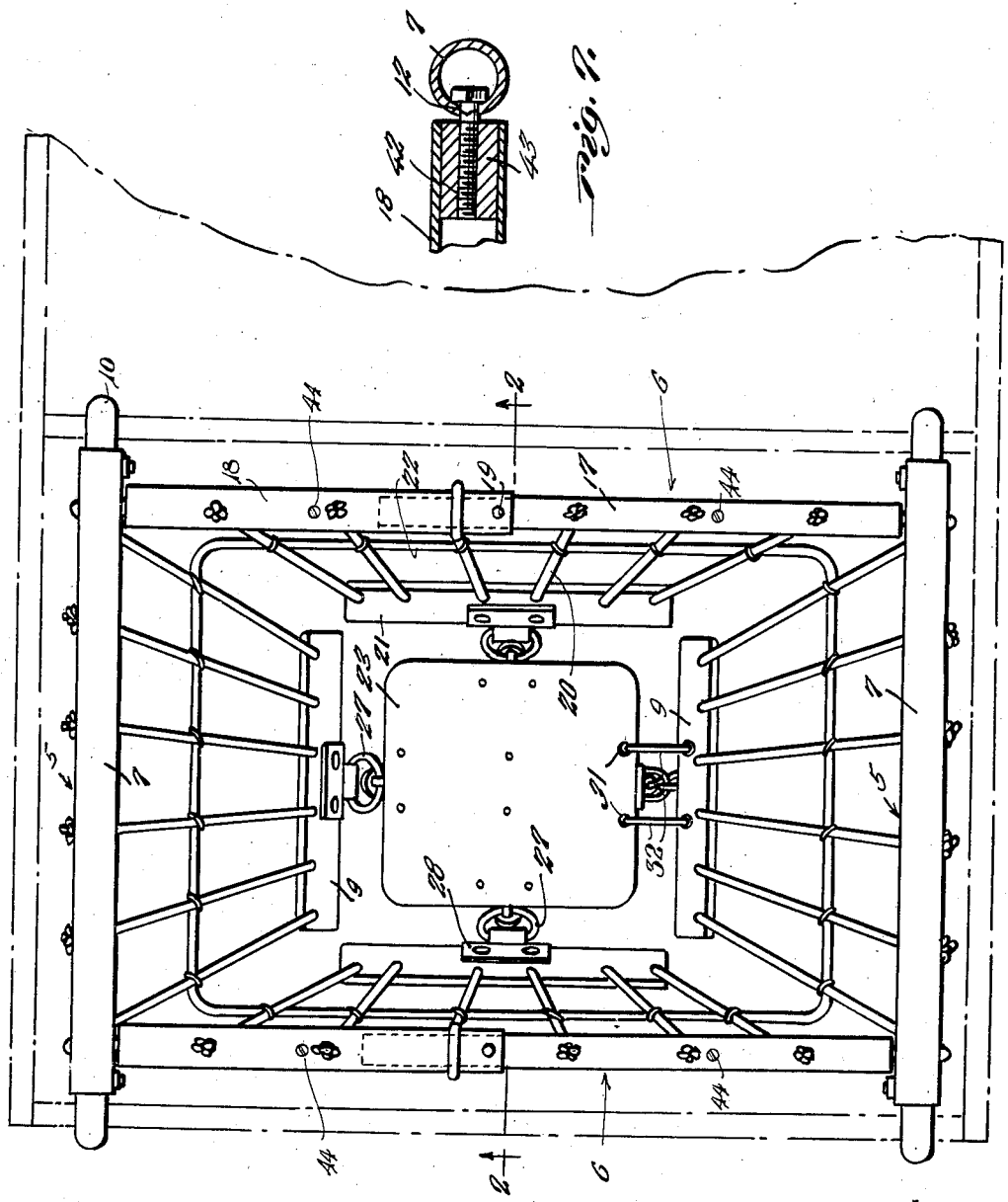

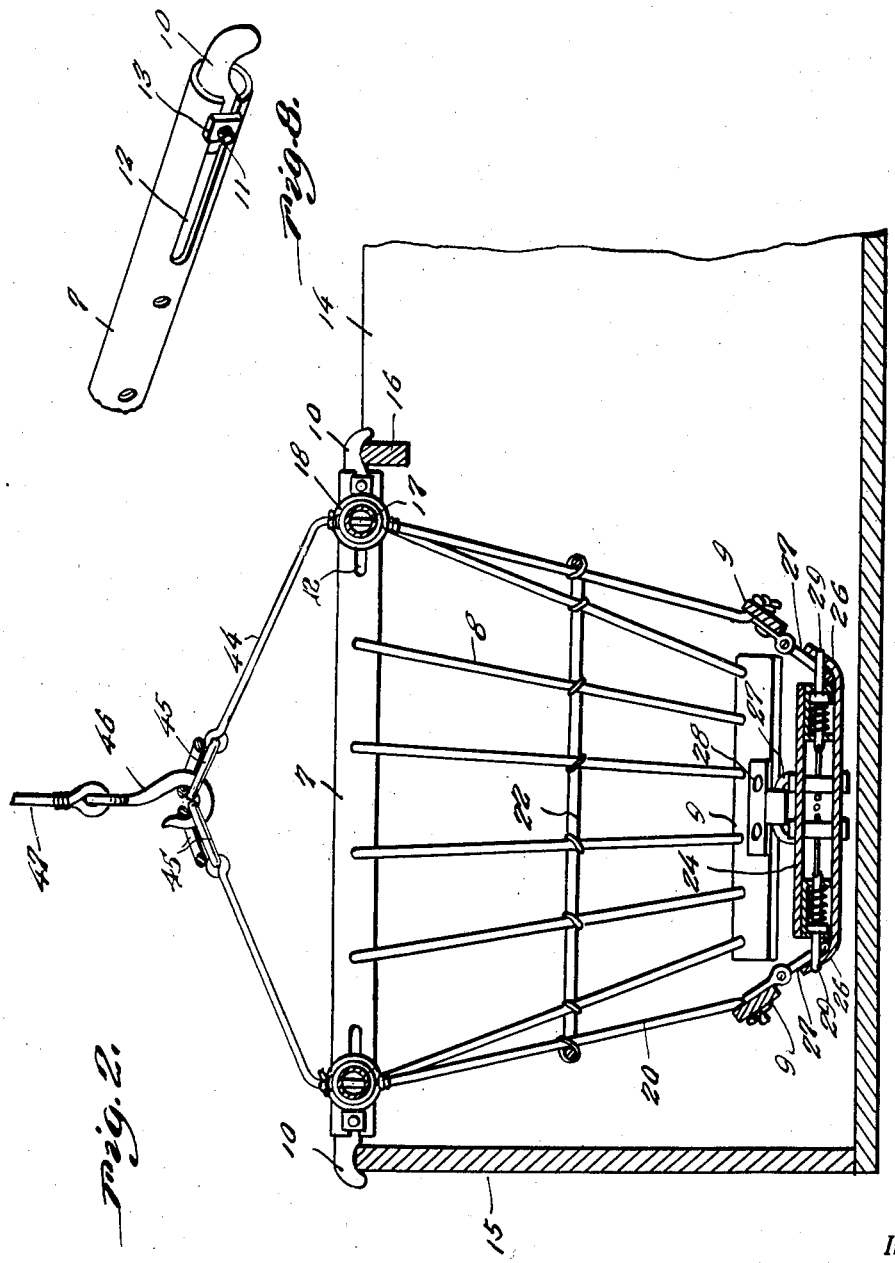

March 28, 1939.   C. KAYSER   2,152,413
CORN RELOADER
Filed June 13, 1938   3 Sheets-Sheet 3
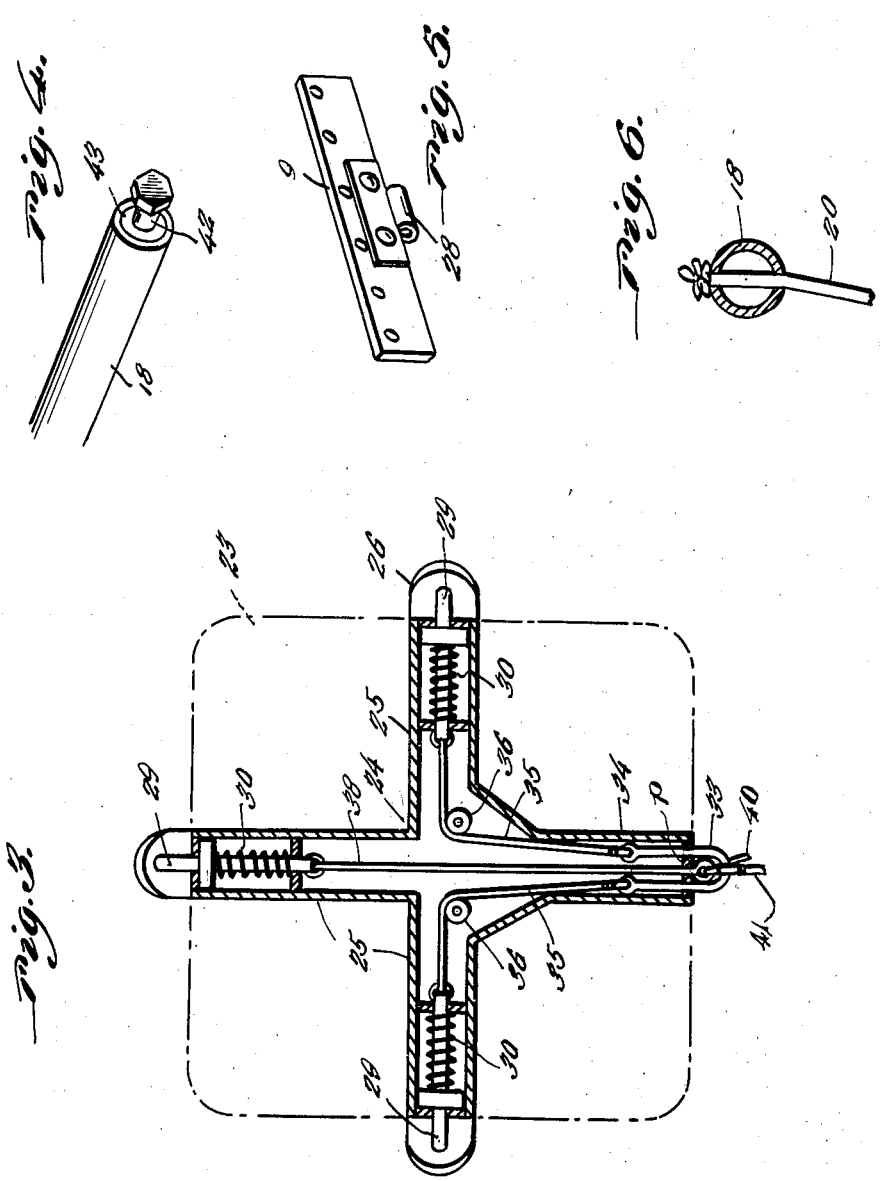

Patented Mar. 28, 1939

2,152,413

UNITED STATES PATENT OFFICE 2,152,413

CORN RELOADER

Casper Kayser, Owatonna, Minn.

Application June 13, 1938, Serial No. 213,489

5 Claims. (Cl. 294—67)

This invention relates to re-loading corn, that is loading corn onto a truck from a wagon box or hay rack.

As is now the practice, picked corn is first loaded into a wagon box or hay rack and from the wagon box or hay rack loaded or transferred to a truck to be hauled to the canning factory or other place dependent upon the use to which the corn is to be put.

As is apparent, this transfer of the corn from the wagon box or hay rack to motor trucks is laborious and requires a great deal of time.

An object of the present invention is to render less laborious and time-consuming this re-loading or transfer of the picked corn from the wagon box or hay rack to motor trucks, and to that end the invention consists in the provision of a basket which may be readily placed within the wagon box to receive corn, and as readily removed bodily from the wagon box and placed over the body of the motor truck for transferring the corn from the wagon box to the truck.

Further in accordance with the present invention the re-loading or transfer basket is provided with a hinged bottom together with latch means releasably securing the bottom in operative position relative to the walls of the basket and which latch means are quickly releasable so as to permit the bottom to swing downwardly and the corn or other contents of the basket to discharge therefrom.

The invention together with its objects and advantages will be best understood from a study of the following description taken in connection with the accompanying drawings wherein:

Figure 1 is a top plan view of the transfer or re-loading basket,

Figure 2 is a vertical sectional view taken substantially on the line 2—2 of Figure 1, Figure 3 is a horizontal sectional view through the latch assembly provided at the bottom of the basket, Figure 4 is a perspective view of one end of one of the sections of one side of the basket, Figure 5 is a perspective view of a plate forming part of a wall of the basket, Figure 6 is a sectional view through one of the side rails of the basket showing the manner of securing one end of a length of rope forming part of a wall of the basket thereto, Figure 7 is a fragmentary detail sectional view showing the manner of connecting the rail member of one side of the basket with the rail member of a second side of the basket, and Figure 8 is a perspective view of one end portion of one of the side rails showing a supporting hook slidably associated therewith.

Referring to the drawings by reference numerals, it will be seen that in accordance with the present invention the transfer or re-loading basket, in the preferred embodiment of the invention, comprises sides 5—5 and 6—6.

Each of the sides 5 comprises an upper tubular rail 7 from which are suspended lengths of rope or other suitable flexible strips 8 that at their lower ends are secured to a side plate 9.

The upper ends of the ropes 8 are threaded through pairs of opposed openings in the side rail 7 and knotted while at the lower ends thereof the ropes 8 are threaded through openings provided therefor in the upper edge of the plate 9 and knotted.

Arranged in the outer ends of the rails 7 are support-engaging hooks 10 that have shank portions slidably fitting within said ends of the side rails 7 and provided with lateral threaded pins 11 that extend through longitudinal slots 12 provided in said ends of the side rails. Threaded on the pins 11 are nuts 13 that are adapted to be threaded home against the rails 7 for securing the supporting hooks 10 at the desired position of adjustment.

The hooks 10 are employed as suggested in Figure 2 for suspending the basket within a wagon box or hay rack 14. In that connection it will be noted that the hooks 10 at one end of the side rails 7 engage over the upper end of an end wall 15 of the wagon box while the hooks 10 at the opposite ends of the rails 7 engage over a transverse supporting cleat 16 supported between opposed sides of the box 14 in parallelism to the wall 15 of the box.

Each of the sides 6 of the basket embodies an upper side rail composed of a pair of telescoping sections 17, 18 that are secured at the desired position of longitudinal adjustment through the medium of a pin 19 engaging in selected openings provided in the sections 17 and 18 of the side rail.

Also each side 6 is composed of a suitable number of ropes or other flexible elements 20 of suitable lengths. The ropes 20 at their upper ends are threaded through pairs of openings provided therefor in the sections 17 and 18 and knotted as shown. At the lower ends thereof the ropes 20 are extended through openings provided therefor in side plates 21 and knotted in a manner to secure the ropes thereto.

In connection with the ropes 20 it will be noted with respect to each side 6, all of the ropes 20 of said side are at the upper ends thereof connected with the rail sections 17 and 18 in the manner just described with the exception of the intermediate rope which latter is looped over the section 18 where said section telescopes the section 17, as a matter of expedience.

Completing the peripheral wall structure of the basket is a suitable length of rope or other flexible element 22 that extends peripherally around the basket and is looped or otherwise connected with the wall-forming strands or ropes 20 in a manner clearly shown in Figure 1.

It will thus be seen that sections 17 and 18 of the sides 6 may be extended or retracted relative to one another as may be necessary to adjust the size of the basket to the width of the wagon box 14.

For the basket there is also provided a bottom plate 23 to the underside of which is riveted or otherwise suitably secured a substantially cruciform latch casing 24.

At the outer extremities thereof three of the arms 25 of the casing 24 are provided with upwardly directed lips or extensions 26 which are adapted to accommodate rings 27 secured by hinge plates 28 to the plates 21 and one of the plates 9 as shown in Figure 1. Cooperable with the keeper rings 27 are latch bolts 29 slidably mounted in each of the three arms 25 and normally urged to projected position through the medium of springs 30 all of which is clearly shown in Figure 3.

At the fourth edge thereof the bottom plate 23 is provided with a pair of openings 31 which receive hinge links 32 that serve to hingedly or pivotally connect the bottom 23 with the other of the side plates 9.

It will thus be seen that the bolts 29 cooperate with the keeper rings 27 to hold the bottom 23 in a closed or operative position with respect to the remaining structure of the basket for retaining the corn or the like placed within the basket.

For releasing the bolts 29 there are provided for two aligned bolts 29 a U-shaped member 33 that is slidably arranged within the fourth arm 34 of the casing 24 and is connected at its opposite ends through the medium of cables 35 with the inner ends of the aforementioned aligned bolts 29. These cables 35 are trained over sheaves 36 provided therefor as shown in Figure 3 within the casing 24. Cables 35 may be operated either simultaneously or independently of one another as found desirable.

For the third bolt 29 there is provided a link 38 that is suitably connected at one end thereof with the inner end of said third bolt 29 and this link 38 extends through the arm 34 of the casing and is connected with a pull cable 40.

A pull cable 41 is connected with the U-shaped member 33. It will thus be seen that by pulling on the cables 40, 41 latch bolts 29 will be retracted against the action of springs 30 out of engagement with the keeper rings 27 so that the bottom 23 will then swing downwardly to open position permitting the contents of the basket, such as corn or the like, to drop through the bottom of the basket.

In connection with the above it will also be noted, as best shown in Figure 3, that welded or otherwise secured to the legs of the U-shaped member 33, is a plate $p$ that has an aperture accommodating the link 38. It will thus be seen that by pulling on cable 40 connected to the link 38 the latch member 29 to which said link 38 is also connected may be retracted independently of the two remaining latch bolts 29. Similarly by pulling on cable 41 connected to the U-shaped member 33 all three of the latch bolts 29 may be retracted, this being apparent from the fact that obviously as the U-shaped member 33 in response to the pull on the cable 41 moves outwardly with respect to the arm 34 of the bolt casing, plate $p$ will engage the eye of the link 38 at the end of the link connected with the cable 40 thus transmitting movement of the member 33 to the link for retracting the bolt 29 to which the link 38 is connected, at the same time that the bolts 29 connected to the U-shaped member 33 are retracted.

The rail sections 17 and 18 of sides 6 are connected respectively with the side rails 7 of sides 5 through the medium of headed studs 42 threaded in bushings 43 provided in the outer ends of the sections 17 and 18 and engaging in the slots 12 of the rails 7 behind the supporting hooks 10 as will be clear from a study of Figures 1, 2, 7 and 8.

For handling the basket by a derrick cable or the like each of the rails 6 has secured thereto one end of ropes or other flexible elements 44 which at their free ends are provided with rings 45 to be engaged with the hook 46 on one end of the derrick cable 47.

In actual practice the basket is positioned as shown in Figure 2 within the wagon box or hay rack 14 and the corn placed within the basket. When the desired amount of corn has been placed within the basket, rings 45 associated with the cables 44 are engaged as shown in Figure 2 with the hook 46 and the cable 47 then raised for lifting the filled basket from out of the wagon box 14 and for swinging the basket to a position over the box or body of the motor truck. When the basket is properly positioned over the box or body of the motor truck the operator then pulls on the cables 40, 41, or on the cable 41 alone for retracting the latches 29 simultaneously whereupon the bottom 23 will swing downwardly permitting the contents of the basket to pass therefrom through the bottom of the basket and into the motor truck.

It will thus be seen that with a basket embodying the features of the present invention, the same may be placed first within a wagon box or hay rack for receiving the picked corn and then bodily lifted from the wagon box or hay rack and positioned over the motor truck body, the construction of the basket being such that the contents of the basket, when the latter is placed over the motor truck body, may be readily discharged therefrom.

It will also be apparent that the basket can be readily disassembled and will require but small storage space. It will also be apparent that the adjustable features of the basket will permit the same to be readily adapted to any size (within reason) of wagon box or hay rack.

It is thought that a clear understanding of the construction, utility and advantages of a basket embodying the features of the present invention will be had without a more detailed description.

Having thus described the invention what is claimed as new is:

1. A basket for the purpose specified having peripheral walls composed of upper rails and lower plates, and flexible elements connecting the plates with the rails, a bottom member hinged at one edge thereof to one of said lower plates, latch means for detachably connecting the other lower plates to the remaining edges of the bottom member, manually operated means for releasing the latch means of one lower plate and manually operated means for simultaneously releasing all the latch means.

2. A basket for the purpose specified having peripheral walls composed of upper rails and lower plates, and flexible elements connecting the plates with the rails, a bottom member hinged at one edge thereof to one of said lower plates, latch means for detachably connecting the other lower plates to the remaining edges of the bottom member, the upper rails of two opposing side walls having longitudinally extending slots therein, projections extending from the ends of the upper rails of the other two side walls, said projections entering the slots for slidably connecting the last-mentioned upper rails with the first-mentioned upper rails and means for connecting lifting means to the upper rails which carry the projections.

3. A basket of the character described comprising pairs of opposed side rails, the rails of one pair being equipped respectively at the ends thereof with support-engaging hooks, and the rails of the other pair respectively comprising telescoping sections provided at their respective free ends with headed studs engaging longitudinal slots provided therefor in the end portions of the rails of the first-mentioned pair, suitable lengths of flexible elements connected at one end thereof with said rails, side plates secured to the lower ends of said flexible elements, there being one side plate for each rail, a bottom member hinged to one of said side plates, keeper rings mounted on the remaining three side plates, spring-projected latch bolts mounted on the underside of said bottom plate and engageable with said keeper rings for releasably securing the bottom plate in a closed or operative position relative to the walls of said basket, and flexible elements connected with said bolts for retracting the bolts whereby to release said bottom plate permitting the latter to swing downwardly relative to the walls of the basket for emptying the basket of the contents thereof.

4. A basket of the character described comprising pairs of opposed side rails, the rails of one pair being equipped respectively at the ends thereof with support-engaging hooks, and the rails of the other pair respectively comprising telescoping sections provided at their respective free ends with headed studs engaging longitudinal slots provided therefor in the end portions of the rails of the first-mentioned pair, suitable lengths of flexible elements connected at one end thereof with said rails, side plates secured to the lower ends of said flexible elements, there being one side plate for each rail, a bottom member hinged to one of said side plates, keeper rings mounted on the remaining three side plates, spring-projected latch bolts mounted on the underside of said bottom plate and engageable with said keeper rings for releasably securing the bottom plate in a closed or operative position relative to the walls of said basket, and flexible elements connected with said bolts for retracting the bolts whereby to release said bottom plate permitting the latter to swing downwardly relative to the walls of the basket for emptying the basket of the contents thereof, flexible suspension elements secured in pairs to the rails of one of said pair of rails, and suspension rings on the free ends of said suspenson elements, as and for the purpose specified.

5. A basket of the class described comprising four side walls each composed of a top rail and a lower plate and flexible members connecting the rail with the plate, a bottom member, means for connecting the bottom member with the lower plates, two of the opposing top rails having longitudinally extending slots in their end portions and the other two top rails having projections at their ends slidably fitting in said slots, hooks slidably arranged at the ends of the slotted rails, and means passing through the slots for clamping the hooks in adjusted position.

CASPER KAYSER.